(12) United States Patent
Lacoste et al.

(10) Patent No.: US 8,259,307 B2
(45) Date of Patent: Sep. 4, 2012

(54) DEVICE FOR OPTICALLY DETECTING POSITION AND/OR ORIENTATION OF OBJECTS AND ASSOCIATED DETECTION METHODS

(75) Inventors: Lilian Lacoste, Cambridgeshire (GB);
 Jean-Louis Lescourret, Merignac (FR);
 Pierre Raybaut, Merignac (FR);
 Siegfried Rouzes, Le Haillan (FR)

(73) Assignee: Thales, Neuilly sur Seine (FR)

( * ) Notice: Subject to any disclaimer, the term of this patent is extended or adjusted under 35 U.S.C. 154(b) by 623 days.

(21) Appl. No.: 12/439,346

(22) PCT Filed: Aug. 31, 2007

(86) PCT No.: PCT/EP2007/059147
 § 371 (c)(1),
 (2), (4) Date: Oct. 21, 2009

(87) PCT Pub. No.: WO2008/028878
 PCT Pub. Date: Mar. 13, 2008

(65) Prior Publication Data
 US 2010/0079830 A1 Apr. 1, 2010

(30) Foreign Application Priority Data

Sep. 5, 2006 (FR) ...................................... 06 07764

(51) Int. Cl.
 *G01B 11/14* (2006.01)
(52) U.S. Cl. ........................................ 356/614; 250/221
(58) Field of Classification Search .................. 250/221; 356/614
 See application file for complete search history.

(56) References Cited

U.S. PATENT DOCUMENTS

| 4,396,945 A | 8/1983 | DiMatteo et al. |
| 5,847,976 A | 12/1998 | Lescourret |

FOREIGN PATENT DOCUMENTS

| GB | 2 254 510 | 10/1992 |
| WO | WO 2005/052718 | 6/2005 |
| WO | WO 2005/059881 | 6/2005 |

OTHER PUBLICATIONS

Anonymous "Fourth Dimension Display" [Online], Apr. 27, 2006, pp. 1-2, XP002427683, Retrieved from the Internet: URL:http://www.forthdd.com/opticalengines.pdf>, retrieved on Mar. 30, 2007.

(Continued)

*Primary Examiner* — Tony Ko
(74) *Attorney, Agent, or Firm* — Lowe, Hauptman, Ham & Berner, LLP (57) ABSTRACT

The present invention relates to a device for optically detecting position and/or attitude of an object (5) moving in a given travel range (4), said device comprising electro-optical sensors positioned on said object and distributed in groups, called clusters (6), analysis and computation means (2) making it possible to find the position and/or the attitude of said object, electronic image generation means (1) and optical projection means (1) comprising a display and a projection optic. The optical projection means emit, in a projection cone, a clear image (3) at any point of the travel range, the analysis of the signals received by the sensors of at least one cluster making it possible to identify the position and/or the attitude of the object in the frame of reference defined by the projection means, the latter consisting of a plane perpendicular to the projection axis, called image plane, and the projection axis.

27 Claims, 5 Drawing Sheets

OTHER PUBLICATIONS

Anonymous "PVPRO Laser Projector" [Online], Feb. 9, 2006, XP002427682, Retrieved from the Internet: URL: http://www.audioholics.com/news/editorials/laser-projectors-coming-to-cell-hones-and-pdas>, retrieved on Mar. 30, 2007.

Griesser, A. et al. "Adaptive Real-Time 3D Acquisition and Contour Tracking within a Multiple Structure Light System", Computer Graphics and Applications, 2004, PG 2004, Proceedings, 12th Pacific Conference on Seoul, Korea Oct. 6-8, 2004, Piscataway, NJ, USA, IEEE, Oct. 6, 2004, pp. 361-370, XP010735064, ISBN: 0-7695-2234-3.

Giovanna, Sansoni et al. "Calibration and Performance Evaluation of a 3-D Imaging Sensor Based on the Projection of Structured Light", IEEE Transactions on Instrumentation and Measurement, IEEE Service Center, Piscataway, NJ, US, vol. 49, No. 3, Jun. 2000, XP011025022, ISSN: 0018-9456.

U.S. Appl. No. 12/439,242, filed Feb. 27, 2009, Siegfried Rouzes (Not Yet Published).

DEVICE FOR OPTICALLY DETECTING POSITION AND/OR ORIENTATION OF OBJECTS AND ASSOCIATED DETECTION METHODS

CROSS-REFERENCE TO RELATED APPLICATIONS

The present Application is based on International Application No. PCT/EP2007/059147, filed on Aug. 31, 2007, which in turn corresponds to French Application No. 0607764, filed on Sep. 5, 2006, and priority is hereby claimed under 35 USC §119 based on these applications. Each of these applications are hereby incorporated by reference in their entirety into the present application.

TECHNICAL FIELD

The present invention relates to the field of devices for optically detecting the position and orientation of objects in space. It applies more particularly to the aeronautical field where, in this case, the object detected is a pilot's headset.

BACKGROUND OF THE INVENTION

The determination of the positioning of a point in space and the determination of the attitude of any object are problems that affect many technical fields.

The various solutions generally provided have to eliminate any position or attitude ambiguity, respond to a more or less stringent dynamic of the systems and provide a high accuracy, in particular in the aeronautical field.

In the systems for detecting position and attitude of objects in space that provide an accuracy of a few millimeters in position and a degree in attitude, there are many applications in various fields.

These systems are used in aeronautics, to detect head posture, notably for the headsets of fighter airplanes, military, civilian or para-civilian helicopters. In the latter para-civilian application case, it may relate to offshore rescue missions for example. They are also used for the detection of simulation headsets, this detection can then be combined with an oculometry device, also called eyetracker, to detect the position of the look. In the field of virtual reality and games, there are also many applications for these systems.

More generally, in the field of generic posture detection, there are also many applications, notably in the medical field for teleoperations and instrument monitoring, in the field of position monitoring for servo-controlled machine tools or remote control, and finally for cinema, in order to reproduce movements in synthesis images.

These various applications have technical solutions that meet more or less stringent requirements.

Regarding applications with low constraints, notably in terms of accuracy, there are various systems for detecting position and/or orientation of objects.

For example, devices with camera-based patch or form recognition use drawings printed on an object. A number of cameras observe the scene and determine the spatial configuration of the observed drawing.

There are also devices with camera-based sphere recognition, which are used, for example in the cinema, to reconstruct human movement. The device uses a number of cameras which observe reflecting spheres and determine their trajectory.

Finally, there are ultrasound positioning devices that rely on the principle of triangulation between ultrasound emitters and receivers.

Concerning more powerful applications, in particular in the aeronautical field, the devices for detecting posture of headsets in aircraft use two main techniques which are electromagnetic posture detection and electro-optical posture detection.

Electromagnetic posture detection requires devices comprising means of emitting an electromagnetic field and receiving sensors on the headset making it possible to determine their position relative to the emitter.

Electro-optical posture detection generally requires motifs of light-emitting diodes, also called LEDs, positioned on the headset and a number of camera-type sensors mounted in the cockpit making it possible to determine the spatial configuration of an LED motif.

To improve performance, it is commonplace to combine other devices comprising sensors of gyroscopic, accelerometric or magneto-metric types. This hybridization of sensors makes it possible to improve the dynamic performance characteristics or eliminate an orientation ambiguity. These sensors do not modify the static positioning performance characteristics of the detection devices cited previously.

However, these solutions have a certain number of drawbacks and limitations, particularly in the aeronautical field.

Regarding the electro-optical devices, the map of the cockpit or more generally the topology of the area containing the object must be known. In aeronautics, this topology can be subject to deformations or be difficult to map.

Moreover, these same devices require a number of cameras and a number of sensors. The position calculations demand numerous resources and the real-time analysis is complex to implement.

Furthermore, the diffusion in the detection area of the light from the LEDs does not make it possible to completely overcome the disturbances from the light environment of the cockpit due to the sun or to spurious reflections on the canopy.

Regarding the electromagnetic posture detection devices, robust solutions are difficult to implement.

In particular, in the aeronautical field, spurious radiations and electromagnetic disturbances can degrade the performance characteristics of the existing systems.

SUMMARY OF THE INVENTION

The inventive device makes it possible notably to overcome the abovementioned drawbacks. In practice, the device is of the electro-optical type. It provides a way of overcoming the drawbacks of the electromagnetic devices.

Also, it preferably uses image projection means of the holographic video projector type.

In particular, monochromatic holographic video projectors have the advantages of emitting, in a very narrow frequency band, a clear image in a wide field and of making it possible to concentrate a high energy in a very small area. It is very easy to discriminate the signal originating from the holographic video projector from the spurious light.

Specifically, the device according to the invention includes electro-optical sensors positioned on the object and distributed in groups, called clusters, analysis and computation means making it possible to find the position and/or the attitude of the object, electronic image generation means and optical projection means comprising a display and a projection optic.

The optical projection means emit, in a projection cone, a clear image at any point of the travel range in which the object can move. The analysis of the portions of images received by the sensors of at least one cluster make it possible to identify the position and/or the attitude of the object in the frame of reference defined by the projection means, the latter comprising a plane perpendicular to the projection axis, called image plane, and the projection axis.

Advantageously, the projection means are a holographic video projector. The latter comprises a coherent light source, a display making it possible to produce a phase image, the projection optic then being arranged so as to create, from the wave emitted by the light source, a first reference wave and a second wave modulated by the display and comprising means making it possible to make these two waves interact.

Furthermore, this holographic video projector can project images in a solid angle of 10 degrees minimum to 120 degrees maximum and can reach a projection speed of at least 24 images per second.

The light source of such a holographic video projector can be monochromatic and emit in a frequency band in the infrared or near-infra-red band, the sensitivity of the sensors being adapted to the emitted radiation.

Advantageously, the projected images can be polarized. Moreover, any type of image can be generated by such a holographic video projector including patterns occupying all or part of the image and comprising light motifs of constant intensity.

As an example, these patterns consist of light motifs, the form of which can be horizontal and/or vertical bars or even circle or concentric rings, each ring being able to alternately consist of dark and bright angular parts, the number of angular portions varying from one ring to the next ring.

Any type of combination of patterns is possible in the image generated by the holographic video projector.

The inventive device uses light, matrix or unit length sensors. The latter can be positioned in groups, also called clusters, having geometric forms adapted to increase the performance characteristics of the device and reduce the computation times.

For example, groups of three sensors can be arranged in star form or in parallelogram form in the inventive device The electro-optical sensors and the analysis means can advantageous interpret and/or discriminate the polarization of the received signals.

Advantageously, a first method of optically detecting the position and the orientation of an object in space by means of the inventive detection device comprises:
  a first step of generation by the holographic video projector of a succession of images, all different, each image giving a different signal on at least one cluster;
  a second step of analysis of the signals received by the sensors of the cluster making it possible to find the position and/or the attitude of the sensors in space without a priori indication.

Advantageously, a second method of optically detecting the position and the orientation of an object in space by means of the inventive device comprises:
  a first step of generation of an image comprising light motifs, said motifs being generated so as to illuminate the clusters;
  a second step of analysis of the signals received by the sensors making it possible to find the position of the sensors in space;
  finally, a third servo-control step making it possible to reposition the motifs of the image generated on the clusters.

Advantageously, a first method combining the two preceding abovementioned methods comprises an initialization step performed according to the first method and an operating step corresponding to the second method.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

In the description that follows, the device described is used for aeronautical applications where the object is a pilot's headset. Obviously, it is possible to adapt the device, with no major modification, to the detection of other objects.

Figure 1:
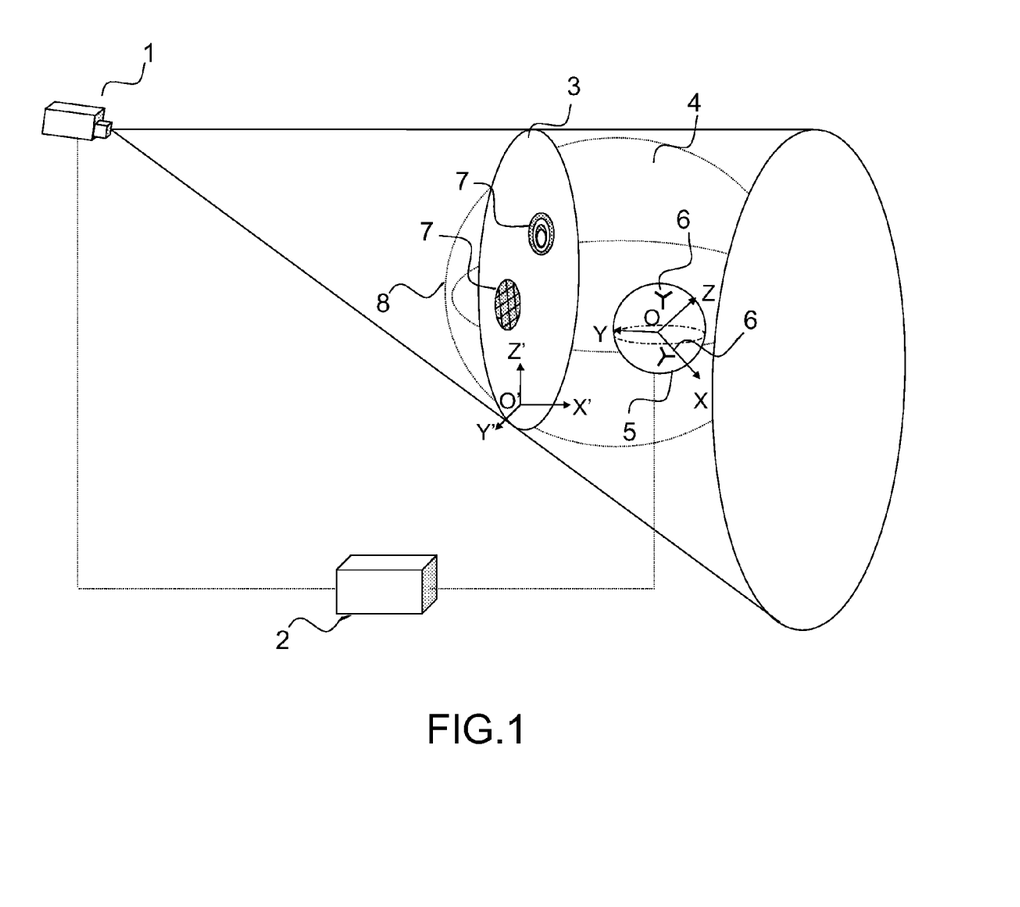
FIG. 1, the general device according to the invention in 3D view.

As indicated in FIG. 1, the inventive device comprises an image projector 1. Said image projector emits an image 3, in focus in the entire area 4, comprising a set of patterns 7. The patterns are projected onto sets of electro-optical sensors 6 situated on the object 5. A pattern is a set of geometrical light motifs on a black background. These patterns can be circles, rings, bars or a noteworthy geometrical form. The set of sensors is called a cluster. These sensors can be grouped in such a way that the cluster has geometrical properties for detection. In order to find the position and the orientation of the clusters in space, the inventive device comprises means of analyzing the data obtained from the sensors. The position and the orientation, of at least one cluster, being determined, the position and the orientation of the object are then known.

For the device to be able to operate correctly, it is essential for the motifs of the patterns to be clear at all points of the sensors. There are various optical means that make it possible to obtain this property.

To this end, an exemplary embodiment of the invention uses as projection means a holographic video projector 1. Such holographic video projectors are produced and marketed, for example, by the company Light Blue Optics and are known by the brand name PVPro. This holographic video projector has the advantageous property of emitting a clear image at any point of the travel range 8.

This holographic video projector comprises a coherent light source, which is generally a laser diode, a display making it possible to produce a phase image, optical means arranged so as to create, from the wave emitted by the light source, a first reference wave and a second wave modulated by the display and means making it possible to make two waves interact. The final image obtained is a Fraunhofer hologram of the phase image generated on the display. It is possible to generate any type of image by this means. The display can be a liquid crystal display, for example of LCOS type.

The image 3 generated by the holographic video projector consists of patterns 7 which can be patterns located on a sensor, called position patterns or roll patterns, or patterns that can cover all of the field, thus occupying all of the image or a large part thereof. The patterns can be emitted sequentially in time, the motifs that make up the pattern being able to change or remain identical between two successive emissions.

The device of FIG. 1 shows an example of clusters 6, each consisting of three sensors, arranged in stars. Each of the clusters is contained in a plane on the surface of the object 5. The sensors can, for example, be unit length matrix sensors.

Patterns generated in this way by the holographic video projector are projected locally on the planes of a sufficient number of clusters of the object. Each cell of each electro-optical sensor that is a part of a cluster detects the presence of the light signals obtained from the pattern. These signals are sent to the computer for analysis.

The size of the patterns and the form and the number of the sensors are optimized data dependent on the travel space and the form and the volume of the object as well as the desired accuracy. The number of clusters and the positioning and the number of patterns can be sufficient for the projection of the patterns to reach a sufficient number of clusters making it possible to find the position of the object from the analysis means 2. The analysis means are generally an electronic computer.

The device has various operating modes. A first operating mode is a servo-controlled mode. The determination of the position and the orientation of the clusters or of the object in space depends on a position and an orientation that are known a priori from a recent past and estimated at the moment of projection, the generated patterns being emitted in the direction of said clusters.

In this mode, the computer 2 analyzes the positions and the orientations of one or more clusters. This computer, based on these data, servo-controlled the position of the patterns projected by the holographic video projector. To this end, the estimated position and orientation of the clusters in space are used to determine the next position of the patterns to be projected in the image plane.

Figure 2:
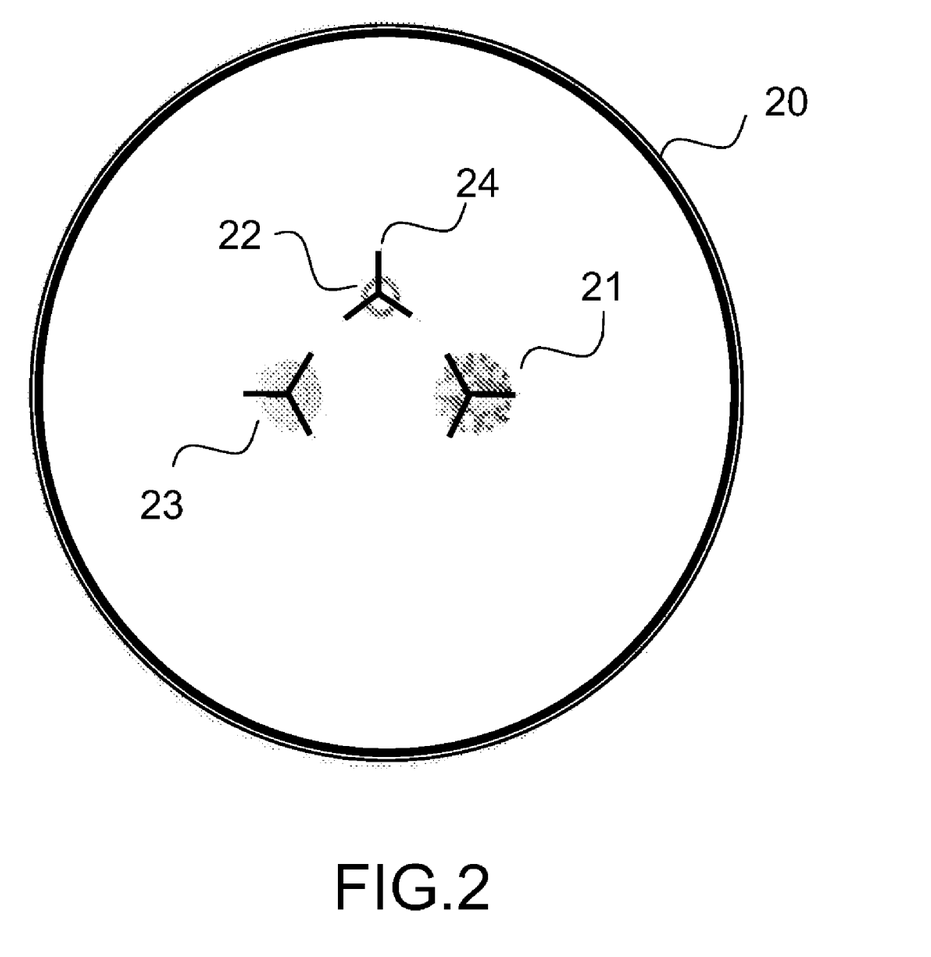
FIG. 2, two position patterns and one roll pattern.

FIG. 2 represents an example of patterns used in this first operating mode. Two position patterns 22 and 23 and one roll pattern 21 are represented within the area 20 delimited by the part of the object that is visible from the projector, this area being represented by a circle. These three patterns are local, in other words, they are centered around a cluster.

The position pattern 22 is an exemplary pattern having a single light ring. Some cells of a sensor of the cluster 24 receive light and supply the computer with information with which to easily estimate, by construction, the position of the cluster in the light ring.

The position pattern 23 is another exemplary pattern having several light rings. In the same way, the computer is capable, based on the information from each cell of each sensor, of restoring the position of the cluster in the light rings.

The pattern 21 is an exemplary roll pattern. The latter comprises various concentric rings, each ring comprising light and dark angular portions of constant width, positioned in such a way that, over the width of a portion, the sequence formed by all of the portions on a radius are unique. The angular position, that is, the orientation, is deduced by analyzing the information collected from each sensor of the cluster.

Figure 3:
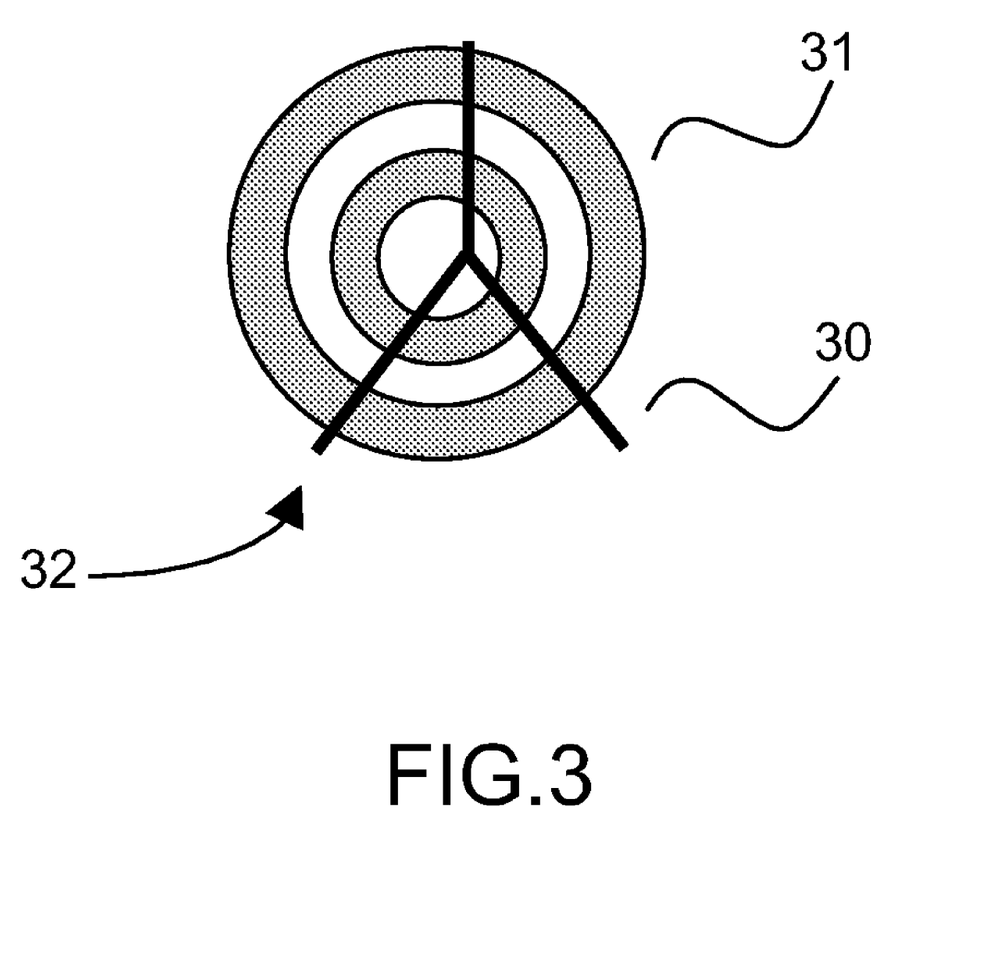
FIG. 3, the projection of a position pattern on a cluster.

FIG. 3 represents an exemplary position pattern and a cluster on the same plane. The servo-control of the patterns projected by the video projector makes it possible to situate the pattern 31 locally around the cluster 32.

Each cell of each sensor 30 restores to the computer the information from the signal received on the computer. From the distribution of the light on the sensor, the computer can, by construction, estimate the position of the cluster in the image plane. In practice, the generation of the patterns, and the estimation of the position and/or attitude parameters, takes account of the corrections of deformation linked to the projection.

The projection speed of the images generated by the holographic projector must be faster than the travel speed of the object.

To this end, the holographic video projector is capable of emitting a series of images at the speed of 24 images per second. This speed is sufficient to emit two successive patterns on at least one cluster.

In another operating mode, it is necessary to find the position and the orientation of the object, that is, without knowing the initial position and orientation of the object beforehand.

One means, using the holographic video projector, of estimating the position of the object in the travel range, is to emit a sequence of patterns in a sufficiently short time. On each projection, a single pattern entirely occupies all or a large part of the generated image. Moreover, between two successive projections, the light motifs of these patterns are different.

The analysis of the signals received from each cell of each sensor throughout the sequence makes it possible to calculate the position of the sensors in space.

Figure 4:
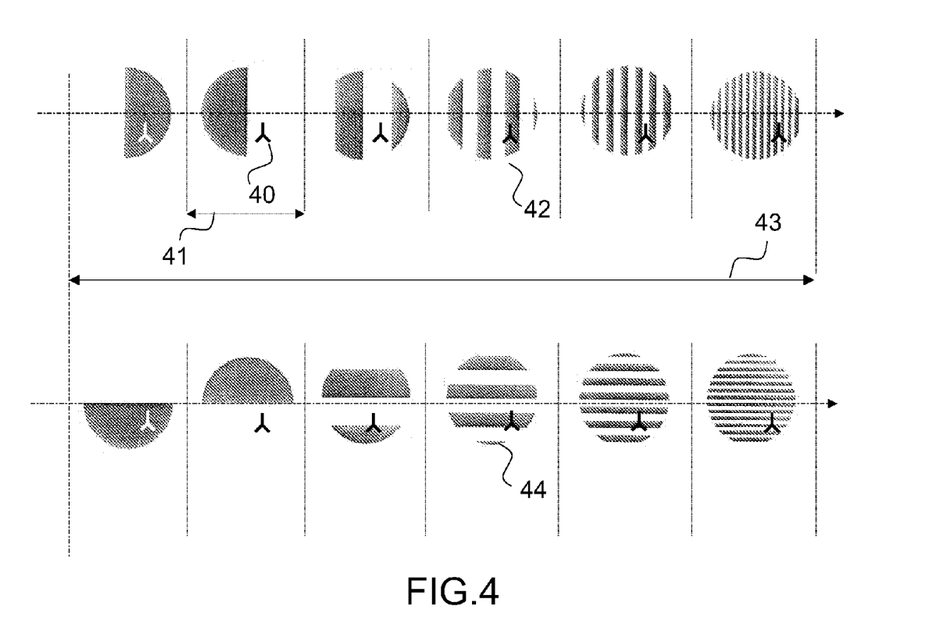
FIG. 4, is an exemplary sequence of patterns projected on a star-configuration cluster.

FIG. 4 shows an example of circular patterns 42 and 44, the motifs of which are light bands alternately separated by dark bands, respectively vertical and horizontal.

A first row of patterns represents a particular sequence of patterns with motifs that are straight vertical bands. This sequence of images is generated in a time 43. The analysis of the sequence of signals received in a cell makes it possible to calculate the vertical position of each cell in the pattern.

A second row of patterns represents another sequence of patterns with motifs that are straight horizontal bands. This sequence of images is generated in a second time 43. The analysis of the sequence of signals received in a cell makes it possible to calculate the horizontal position of each cell in the pattern.

The entire sequence of images consists of the two preceding sequences. These sequences of images can, for example, be generated in succession. Each image can alternately comprise a pattern with horizontal bands and the next with vertical bands.

The cluster 40 is represented in the plane of the pattern, called image plane, said cluster is exposed to the light signals of the motifs of each pattern. The principle is to emit, in a time 43, a sequence of patterns 42, each exposed for a time interval 41. The width of the bands and the pitch between the bands that make up each pattern are increasingly small. They can diminish by a factor of two between each projection, for example.

Figure 5:
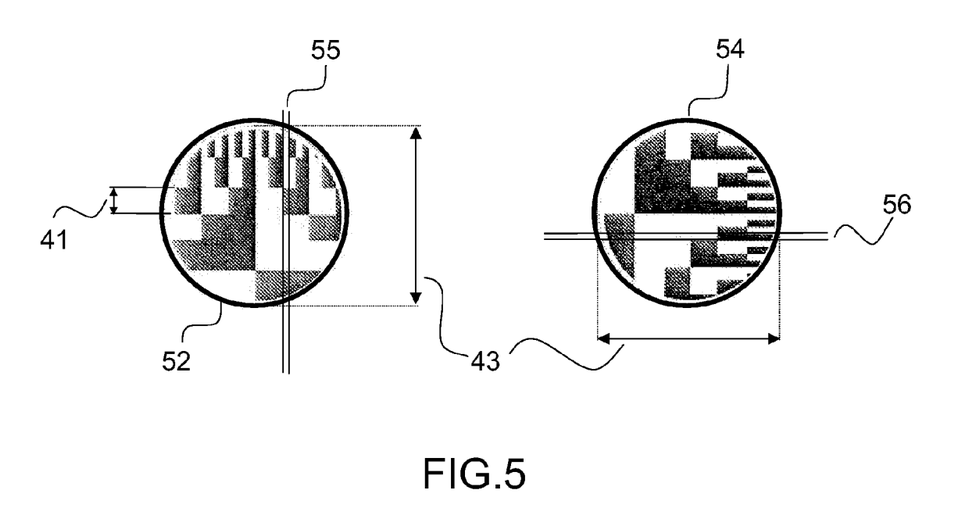
FIG. 5, is a representation of the combination of patterns according to FIG. 4 projected in succession.

FIG. 5 represents an exemplary representation of a compilation 52 of patterns 42 comprising light vertical bands and another representation of a compilation 54 of patterns 44 comprising light horizontal bands. The compilation of patterns comprising vertical bands represents the succession of light or dark signals received by a cell of a sensor when it is located in the band 55 during the time interval 41. The sequence of signals received in the time 43 is analyzed. By construction, the horizontal position of the cell in the pattern is deduced.

In the same way, the cell interprets its vertical position when it is located in the band 56 of the compilation of patterns 54.

To eliminate any position ambiguity on the projection of the first image on the sensors, that is, to differentiate the case of a signal received by the cell from a dark fringe and the case where no signal is received, it is necessary for the light bands of the first two patterns projected to be of the same size and alternate.

Advantageously, a binary coding can be used for the analysis of these signals. In the case of a signal obtained from a light fringe, the cell interprets a bit of value equal to 1, otherwise it interprets a bit of value equal to 0.

Since the bands diminish from one projection to the next in one and the same sequence, the high-order bits are interpreted at the start of the sequence. The information concerning the accuracy of the vertical and/or horizontal position is interpreted at the end of the sequence, by the low-order bits.

Such sequences of patterns, associated with this type of binary coding of the receiving signal, make it possible to directly determine the vertical and, respectively, horizontal position of a cell of a sensor in the pattern.

The accuracy of the position of a cell of a sensor is determined to within the error of the width of the light or dark band of the last projected pattern of the sequence.

Generally, any unambiguous image or series of images can be used as a means of determining the initial position.

The two operating modes, servo-controlled and absolute, can be combined. On initializing or reinitializing the detection of the object, that is, when the position of the object is not known, the position and the orientation of the object can be determined by the second detection mode. Then, secondly, the position and the orientation being determined by the detection initialization step, a servo-controlled mode detection step begins. The second step proceeds independently until the detection is deliberately interrupted or until the position of the object is lost. In the latter case, the first step, that is, the second operating mode, can be reactivated automatically or manually to find the position of the object.

The benefit of using the servo-controlled mode is that it makes it possible to generate a very limited number of patterns between two measurements. Consequently, very fast measurement rates can be used.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A device for optically detecting position and/or orientation of an object moving in a given travel range, said device comprising electro-optical sensors positioned on said object and distributed in groups, called clusters, analysis and computation means making it possible to identify the position and/or the attitude of said object, electronic image generation means and optical projection means comprising a display and a projection optic, wherein the optical projection means emit, in a projection cone, a clear image at any point of the travel range, the analysis of the signals received by the sensors of at least one cluster making it possible to identify the position and/or the attitude of the object in the frame of reference defined by the projection means, the latter comprising a plane perpendicular to the projection axis, called image plane, and the projection axis.

2. The detection device as claimed in claim 1, wherein the image projection means are a holographic video projector, said holographic video projector comprising a coherent light source, a display making it possible to produce a phase image, the projection optic being arranged to create, from the wave emitted by the light source, a first reference wave and a second wave modulated by the display and comprising means making it possible to cause these two waves to interact.

3. The detection device as claimed in claim 2, wherein the projection means project in a solid angle of 10 degrees minimum to 120 degrees maximum.

4. The detection device as claimed in claim 2, characterized wherein the projection means generates the images at the speed of at least twenty-four images per second.

5. The detection device as claimed in claim 2, wherein the projection means generates polarized images.

6. The detection device as claimed in claim 5, wherein the electro-optical sensors and the analysis means interpret and/or discriminate the polarization of the received signals.

7. The detection device as claimed in claim 2, wherein the images projected in the image plane by the projection means comprise a set of patterns, the patterns consisting of light motifs.

8. The detection device as claimed in claim 7, wherein the patterns consist of motifs of constant light intensity.

9. The detection device as claimed in claim 7, wherein the light source is monochromatic and emits in a frequency band in the infra-red or near-infra-red band, the sensitivity of the sensors being adapted to the emitted radiation.

10. The detection device as claimed in claim 7, wherein at least one pattern consists of concentric light motifs, said pattern being a position detection pattern.

11. The detection device as claimed in claim 7, wherein at least one pattern consists of concentric rings, each ring alternately consisting of dark and bright angular parts, the number of angular portions varying from one ring to the next ring, said pattern being a roll detection pattern.

12. The detection device as claimed in claim 7, wherein the image comprises two position detection patterns and one roll detection pattern.

13. The detection device as claimed in claim 7, wherein a single projected pattern occupying all or part of the image consists of motifs, the form of which is a series of alternately dark and light parallel bands.

14. The detection device as claimed in claim 13, wherein the bands are of identical width, the pitch separating two successive bands being constant.

15. The detection device as claimed in claim 13, wherein a series of patterns are projected successively in time with motifs, the pitch and width of which change on each generated image.

16. The detection device as claimed in claim 13, wherein the size of the band and of the pitch reduces by a factor of 2 between two successive projections.

17. A method of optically detecting the position and the orientation of an object in space by means of a detection device as claimed in claim 13, wherein said method comprises a first step of generation by the holographic video projector of a succession of images, all different, each image giving a different signal on at least one cluster and a second step of analysis of the signals received by the sensors of the cluster making it possible to find the position and/or the attitude of the sensors in space without a priori indication.

18. The method of optically detecting the position and the orientation of an object in space by means of a device as claimed in claim 7, comprising:
- a first step of generation of an image comprising light motifs, said motifs being generated so as to illuminate the clusters;
- a second step of analysis of the signals received by the sensors making it possible to find the position of the sensors in space;
- finally, a third servo-control step making it possible to reposition the motifs of the image generated on the clusters.

19. The detection device as claimed in claim 1, wherein the sensors are matrix, unit length or light sensors.

20. The object position detection device as claimed in claim 19, wherein the topology of the sensors, on the object, comprises a number of clusters of sensors, each cluster having a flat form consisting of three star-configuration branches.

21. The object position detection device as claimed in claim 19, wherein the topology of the sensors, on the object, has a number of clusters of sensors, each cluster having a parallelepipedal flat form.

22. The detection device as claimed in claim 19, wherein the object is a headset and the travel range is a part of the cockpit.

23. A method of optically detecting the position and the orientation of an object in space by means of a detection device comprising:
- a first step of generation by the holographic video projector of a succession of images, all different, each image giving a different signal on at least one cluster and a second step of analysis of the signals received by the sensors of the cluster to find the position and/or the attitude of the sensors in space without a priori indication;
  - generating an image comprising light motifs, said motifs being generated so as to illuminate the clusters;
  - analyzing the signals received by the sensors making it possible to find the position of the sensors in space;
  - servo-controlling to reposition the motifs of the image generated on the clusters.

24. The method of optically detecting the position and the orientation of an object in space by means of a detection device according to claim 23, where the detection device is a device for optically detecting position and/or orientation of an object moving in a given travel range, said device comprising electro-optical sensors positioned on said object and distributed in groups, called clusters, analysis and computation means making it possible to identify the position and/or the attitude of said object, electronic image generation means and optical projection means comprising a display and a projection optic, wherein the optical projection means emit, in a projection cone, a clear image at any point of the travel range, the analysis of the signals received by the sensors of at least one cluster making it possible to identify the position and/or the attitude of the object in the frame of reference defined by the projection means, the latter comprising a plane perpendicular to the projection axis, called image plane, and the projection axis.

25. The detection device as claimed in claim 24, wherein the image projection means are a holographic video projector, said holographic video projector comprising a coherent light source, a display making it possible to produce a phase image, the projection optic being arranged to create, from the wave emitted by the light source, a first reference wave and a second wave modulated by the display and comprising means making it possible to cause these two waves to interact.

26. The detection device as claimed in claim 25, wherein the images projected in the image plane by the projection means comprise a set of patterns, the patterns consisting of light motifs.

27. The detection device as claimed in claim 26, wherein a single projected pattern occupying all or part of the image consists of motifs, the form of which is a series of alternately dark and light parallel bands.

\* \* \* \* \*